(12) United States Patent
Gregoire

(10) Patent No.: US 7,360,567 B2
(45) Date of Patent: Apr. 22, 2008

(54) POSITIONING SYSTEM FOR WORK PIECE MILLING

(76) Inventor: Wayne Jacob Gregoire, 12771 Gordon Dr., Eden Prairie, MN (US) 55346

( * ) Notice: Subject to any disclaimer, the term of this patent is extended or adjusted under 35 U.S.C. 154(b) by 121 days.

(21) Appl. No.: 10/601,040

(22) Filed: Jun. 20, 2003

(65) Prior Publication Data

US 2004/0256028 A1    Dec. 23, 2004

(51) Int. Cl.
*B27C 5/00* (2006.01)
*B27C 1/12* (2006.01)

(52) U.S. Cl. .................................................. 144/253.1
(58) Field of Classification Search ..............................
144/253.1–253.91, 134.1, 114.1, 286.1, 286.5; 269/289 R
See application file for complete search history.

(56) References Cited

U.S. PATENT DOCUMENTS

| | | | | |
|---|---|---|---|---|
| 2,668,568 A | * | 2/1954 | Budd | 144/135.2 |
| 4,481,846 A | * | 11/1984 | Goodell | 83/438 |
| 5,617,909 A | * | 4/1997 | Duginske | 144/253.1 |
| 6,237,658 B1 | * | 5/2001 | Hylton | 144/253.2 |
| 6,619,347 B2 | * | 9/2003 | Jukoff et al. | 144/253.6 |

OTHER PUBLICATIONS

Roger W. Cliffe & Michael Holtz, Shaper Handbook, copyright 1990, pp. 128-132, Sterling Publishing Company, Inc., New York City, New York, USA.

* cited by examiner

*Primary Examiner*—Shelley Self

(57) ABSTRACT

An adjustable back fence for work piece milling on woodworking tools is disclosed having an indexing channel system including at least one channel having an elongated slot with a channel stop at one end. The channel is adjustably attachable to the woodworking tool in a desired configuration with respect to the woodworking tool. The indexing channel system includes at least one indexing spacer of predetermined length that fits within and is retained in the elongated slot of the channel. The adjustable back fence includes a horizontal member attachable to the indexing system through at least one adjustable connection having a connection member extending into the elongated slot of the channel. The connection member interacts with the elongated slot to secure the horizontal member to the channel in a spaced relationship from the channel stop, the spaced relationship determined by the length of the indexing spacer.

16 Claims, 17 Drawing Sheets

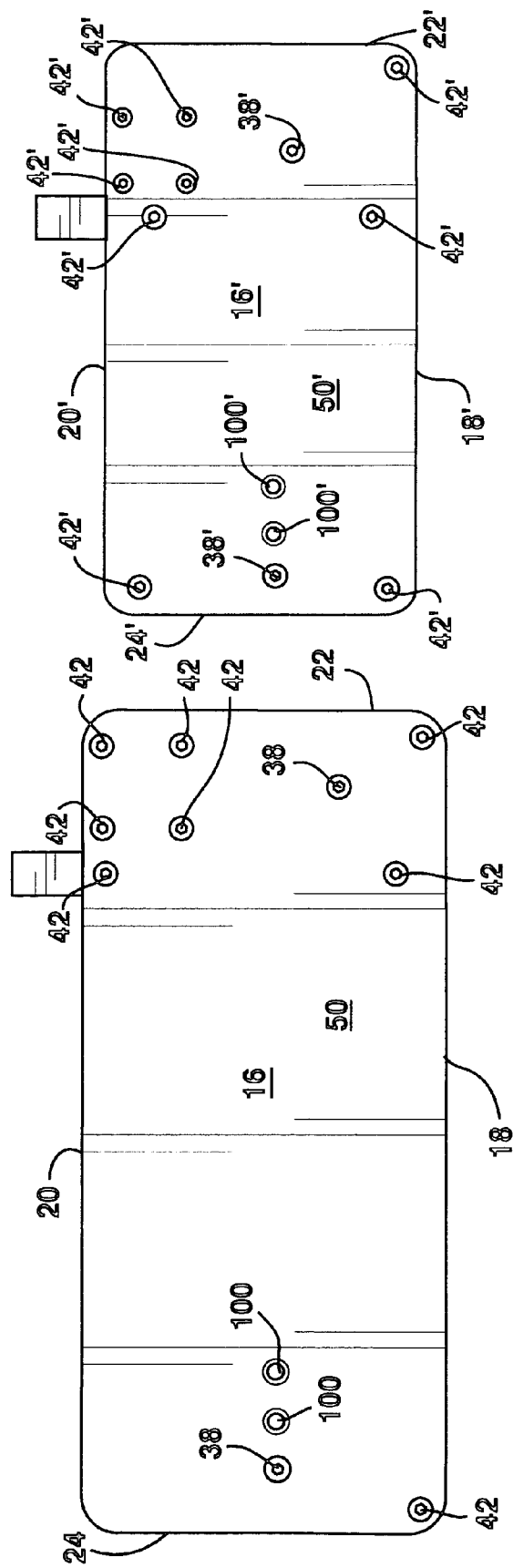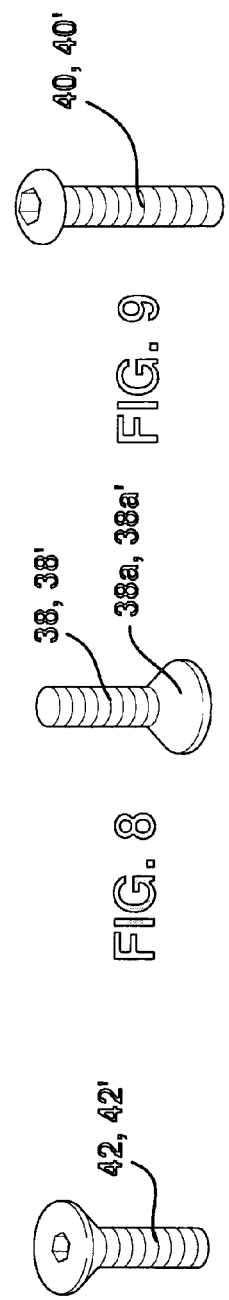

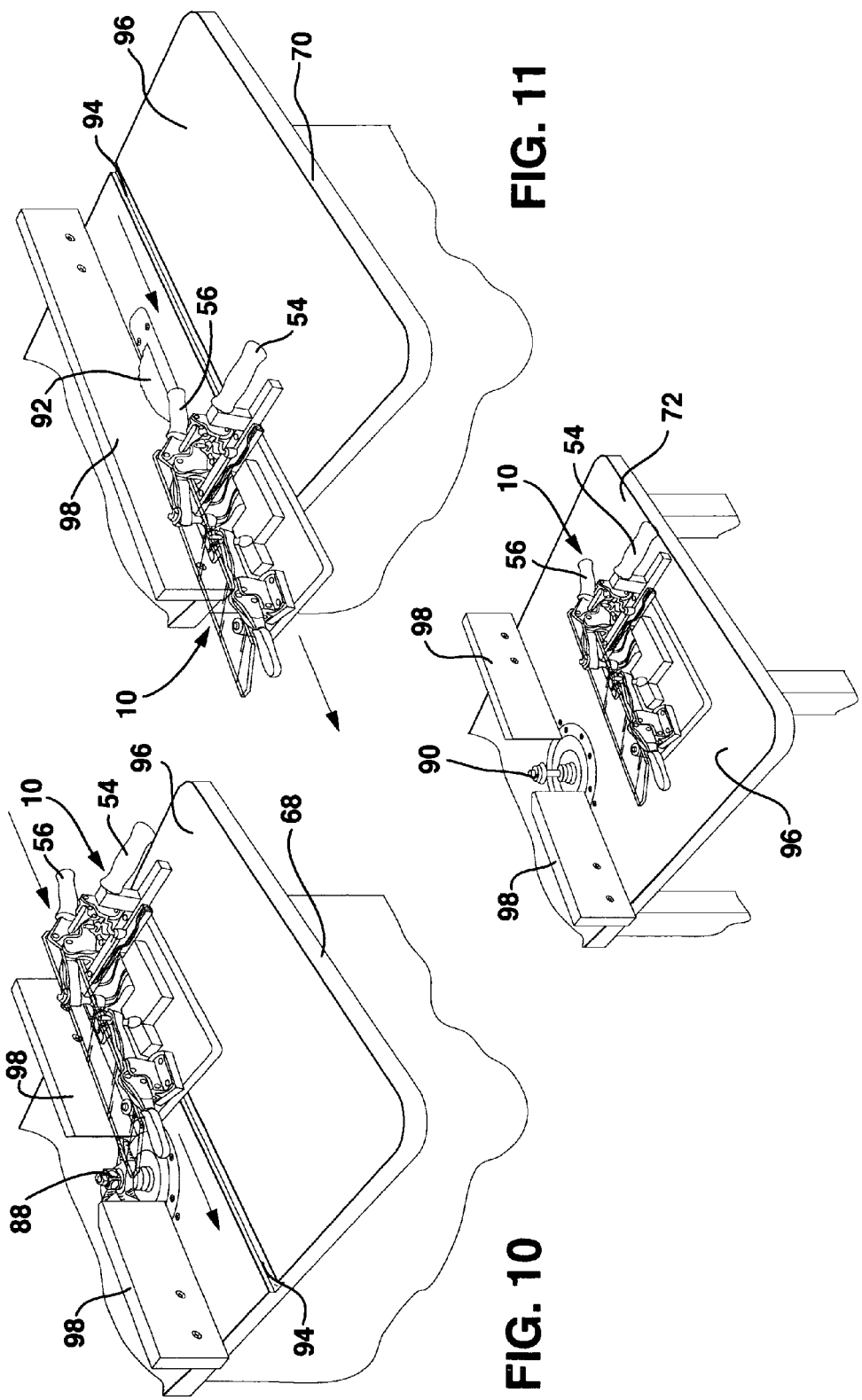

POSITIONING SYSTEM FOR WORK PIECE MILLING

BACKGROUND OF THE INVENTION

The present invention relates generally to clamping apparatus and feeding stock material on a wood shaper, a router table and a table saw, particularly to normal cutting, shaping and precision processing of material on a wood shaper, a router table and a table saw, and specifically to climb cutting, shaping and the precision processing of stock material and in the form of small pre cut panels.

The use of fingers, finger boards, hold down devices, power feeders, fences and a miter slot accommodating miter gages, sliding miter jigs and other accessories milled in the stock support tables of wood shapers, router tables and table saws is representative of the prior art that has addressed apparatus associated with the processing of materials. The invention described does not solve the problem of high precision processing of stock material and small work pieces of material with accuracy, safety, speed and consistent results.

These systems and methods allow for the manufacture of medium size work pieces only, in a cumbersome manner, while the operator contends with the issue of clogging. Cut material debris in a recessed miter slot may result in the loss of precision and hazard to the operator.

There is no system, which currently exists that can easily be converted to process small work pieces with great precision, flexibility of positioning and offer operator ease and safety.

Existing systems do not produce precision consistent results, efficient use of the operators time or reduce operator stress. Kick back, potential for injury, is not reduced.

There is no system that eliminates saw marks and chatter, the use of waxes, chipping, splitting, tear and blow out of the work piece.

These systems do not dimension the wood as well as form it. Slightly over cut material is not accommodated. Existing systems do not have a unique indexing system that uses spacers or interfaces with other manufacturers gages for precision processing of materials.

Many systems do not eliminate waste and improve the performance of the machine on which it is installed.

These systems require a number of light passes to be made. The best feed rate is the slowest speed.

From the above, it can be seen what is needed is a system and a process for installation of it's major components, comprised of a clamping apparatus and adjustable back fence, for the precision processing of work pieces on a wood shaper, router table and table saw with a greater degree of operator ease, speed, safety, more economical and consistent results, as a clamping apparatus and back fence assembly.

OBJECTIVES

The primary object of this invention is the precision processing and feeding of stock material and to provide a clamping apparatus for precision processing of material on a wood shaper, a router table and a table saw.

A more specific object of the present invention is to universally adapt to already existing wood shapers, router tables and table saws.

Another object of the present invention is the ability to deliver a portable system of material clamping and handling to existing wood shapers, router tables and table saws.

Another object of the present invention is to control stability of the work piece while it is being processed.

Another object of the present invention is to deliver a work piece to the machine cutter with controlled precision.

Another object of the present invention is to provide mobility to fixed clamp options for the work piece.

Another object of the present invention is to provide flexibility in positioning and clamping options for the work piece.

Another object of the present invention is to provide a more stable means to process the work piece.

Another object of the present invention is to receive a higher degree of safety for the machine operator.

Another object of the present invention is to provide improved visibility of the process for the machine operator.

Another object of the present invention is to produce precision consistent results, efficient use of the operators time or reduce operator stress. Kick back, potential for injury, is reduced.

Another object of the present invention is to eliminate saw marks and chatter, the use of waxes, chipping, splitting, tear and blow out of the work piece.

Another object of the present invention is to dimension the wood as well as form it. Slightly over cut material is accommodated.

Another object of the present invention is a unique indexing system that uses spacers and interfaces with other manufacturers gages for precision processing of materials.

Another object of the present invention is the elimination of waste and improved performance of the machine on which it is installed.

Another object of the present invention is to accommodate normal cutting and shaping, climb cutting and shaping and precession processing of stock materials and in the form of small pre-cut panels.

Another object of the invention is to allow easy use of one shaper to do both cope and Pattern cuts with little set up time.

Another object of the invention is to keep the operators hands away from the cutters, when cutting.

Another object of the invention is to allow operators view of cut in progress.

Another object of the invention is to eliminate the use of a miter slot.

Another object of the invention is to allow material to be run through the cutter in either direction.

SUMMARY OF THE INVENTION

The present invention is a system and a process for installation of it's major components, comprised of a clamping apparatus and adjustable back fence for precision processing of material on a wood shaper, a router table and a table saw. Typically these power tools are used in wood working shops by professionals and amateurs. These tools are used to process other materials as well. As a result of the use of this system and it's process for installation, material processing precision and operating conditions are greatly improved.

In the preferred embodiment, the assembly features a portable platform universally adaptable to various types of wood shapers, router tables and table saws. The present invention, which is operator controlled, allows for loading and precision placement of a work piece in a controlled and flexible clamping environment. The machine operator is then able to move the work piece through the cutting operation in a positively engaged way with high visibility and with a greater degree of operator safety. The assembly features a back fence, indexing system and compatibility with other manufacturers equipment. The system is useable with power feeders as well as accommodating manual feeding.

BRIEF DESCRIPTION OF THE DRAWINGS

In order that the invention may be clearly understood and readily carried into effect, a preferred embodiment of the invention will now be described, by way of example only, with reference to the accompanying drawings wherein:

All Figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength and similar requirements will likewise be within the skill of the art after the following description has been read and understood.

Figure 1:
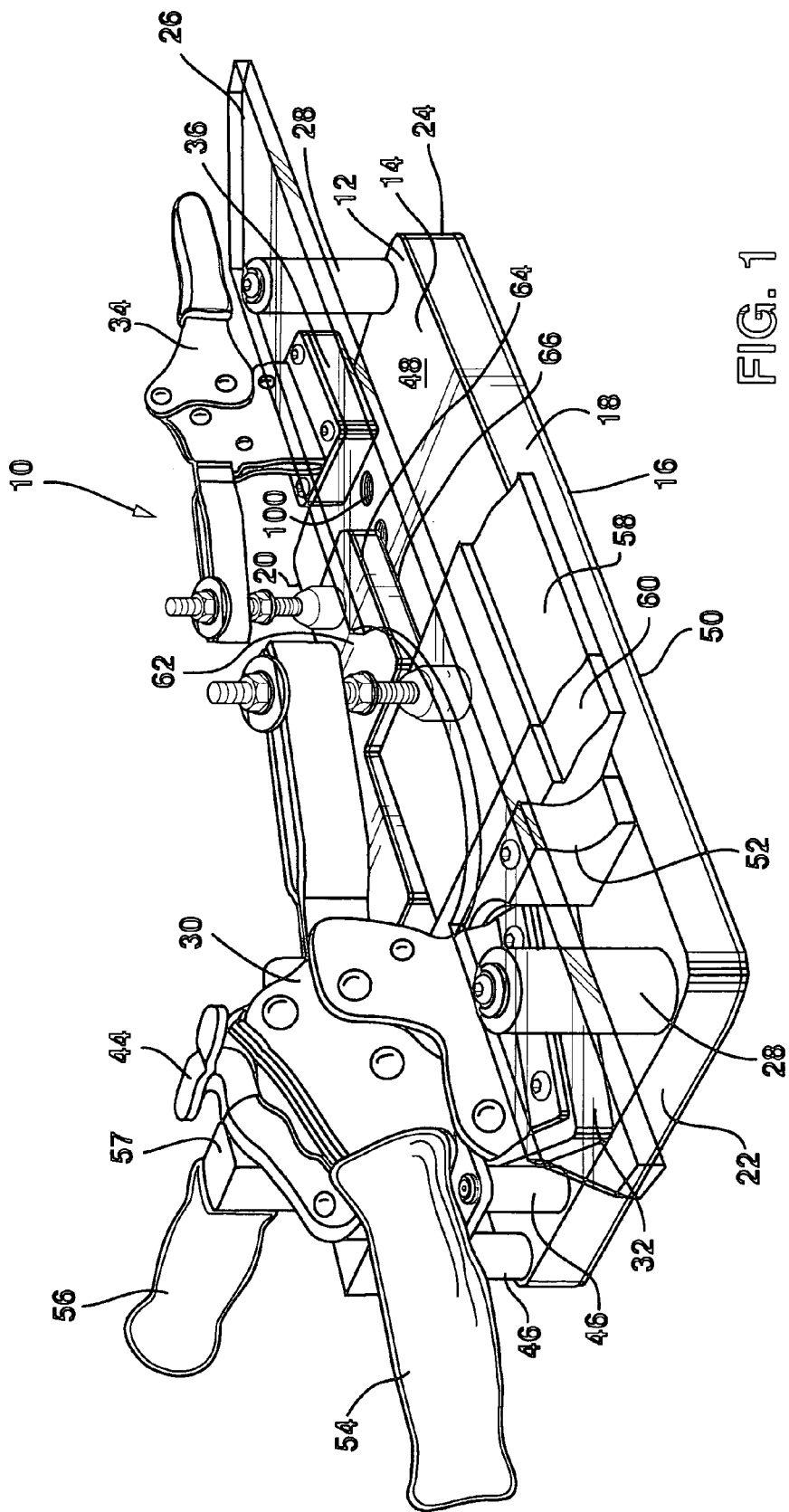

Where used in the various figures of the drawings, the same numerals designate the same or similar parts. Furthermore, when the terms "inner", and "outer", and similar terms are used herein, it should be understood that these terms have reference only to the structure shown in the drawings as it would appear to a person viewing the drawings and are utilized only to facilitate describing the preferred embodiments.

FIG. 1 is a perspective view of the clamping apparatus assembly.

Figure 2:
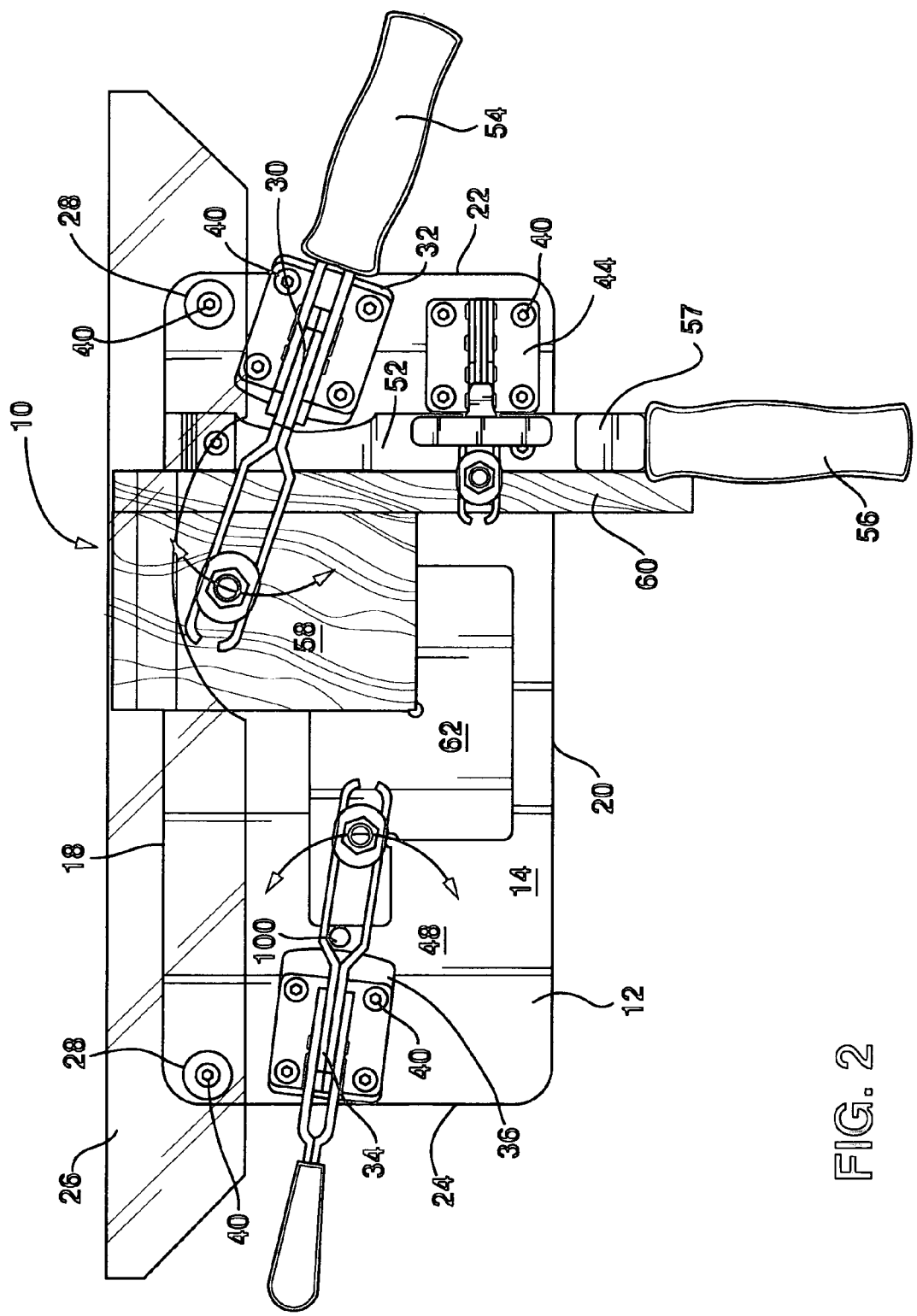

FIG. 2 is a plan view of the clamping apparatus of FIG. 1.

Figure 3:
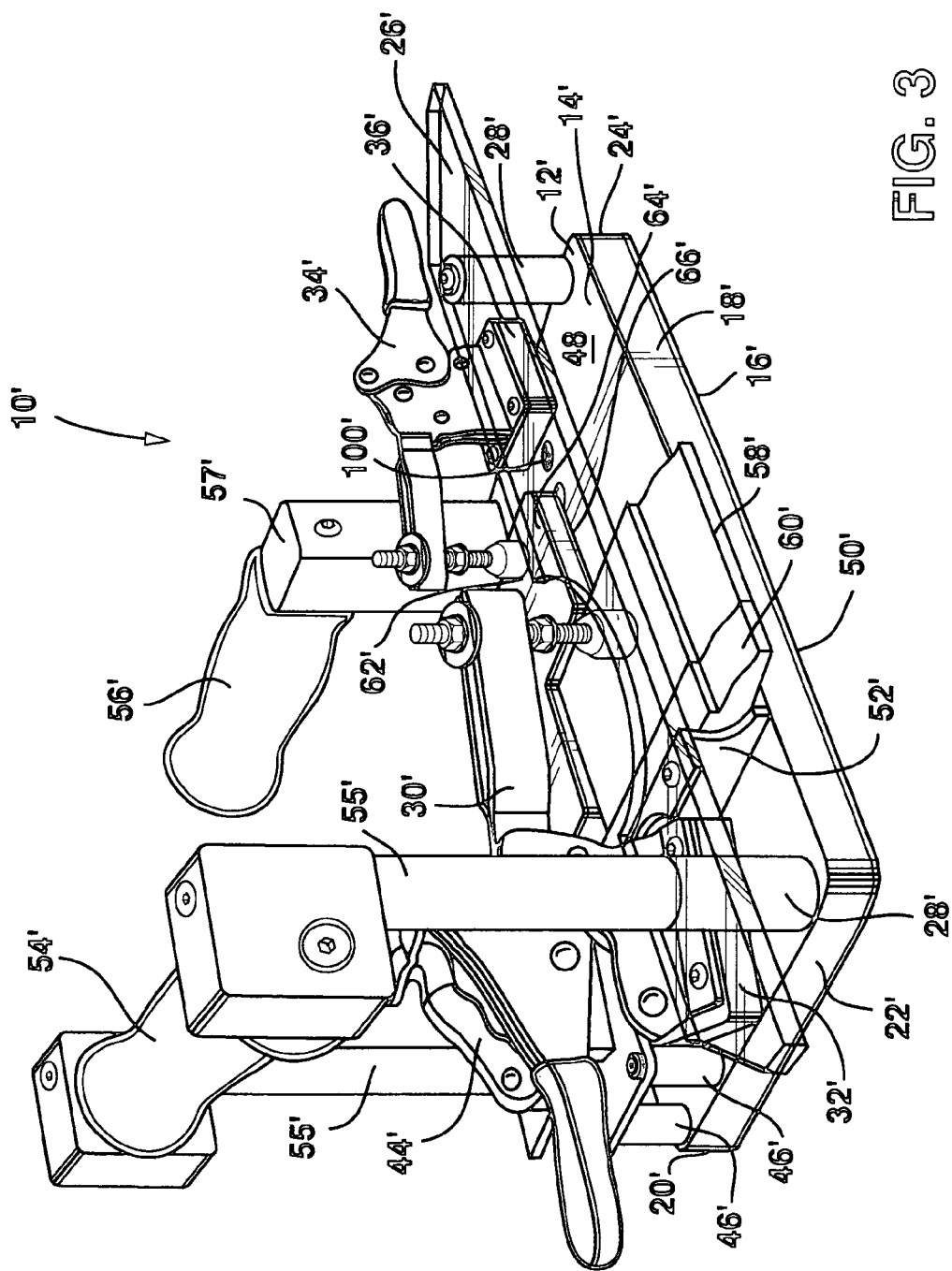

FIG. 3 is perspective view of a first embodiment assembly of the clamping apparatus of FIG. 1.

Figure 4:
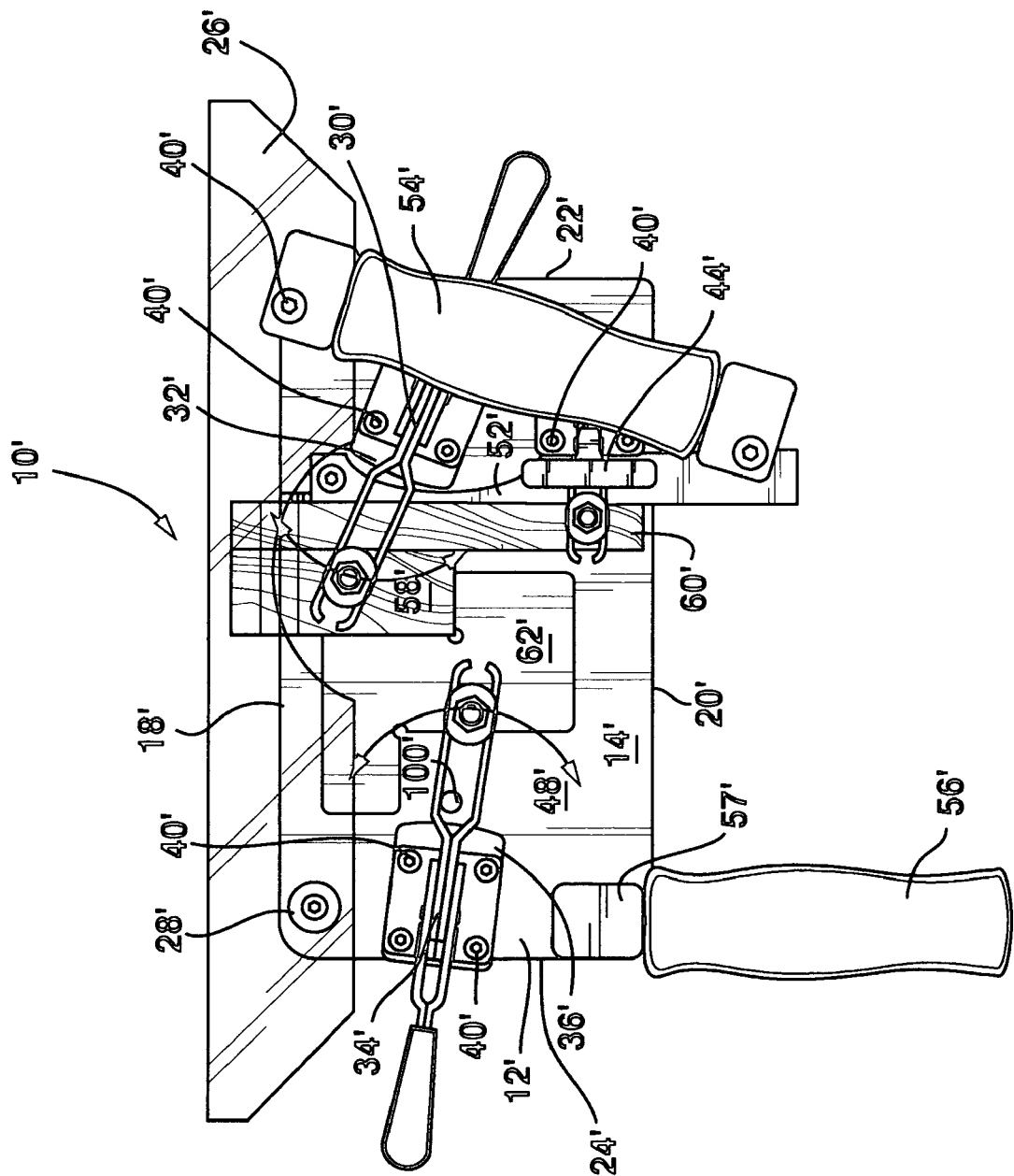

FIG. 4 is a plan view of the clamping apparatus of FIG. 3.

FIG. 5 is a bottom view of the clamping apparatus assembly of FIG. 1.

FIG. 6 is a bottom view of the clamping apparatus assembly of FIG. 3.

FIG. 7 is a top perspective view of a typical flat head machine bolt used in the general assembly of the clamping apparatus.

FIG. 8 is a bottom perspective view of a typical flat head machine bolt used in the general assembly of the clamping apparatus.

FIG. 9 is a top perspective view of a typical round head machine bolt used in the general assembly of the clamping apparatus.

FIG. 10 is a perspective view of a wood shaper with the clamping apparatus assembly of FIG. 1 shown in use.

FIG. 11 is a perspective view of a table saw with the clamping apparatus assembly of FIG. 1 shown in use.

FIG. 12 is a perspective view of a router table with the clamping apparatus assembly of FIG. 1 shown in use.

Figure 13:
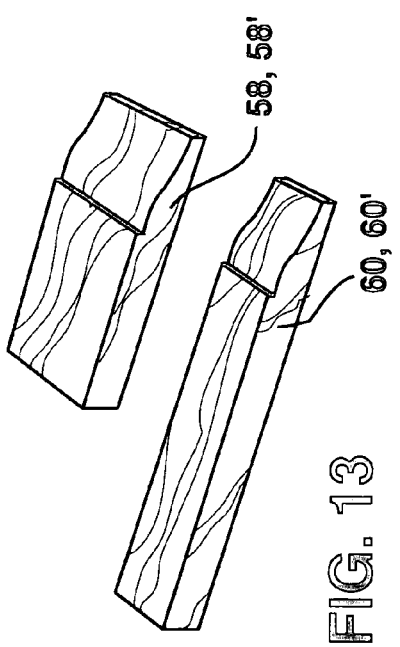

FIG. 13 is a perspective view of a typical work piece and a typical sacrifice stick as shown in FIG. 1 through FIG. 4.

Figure 14:
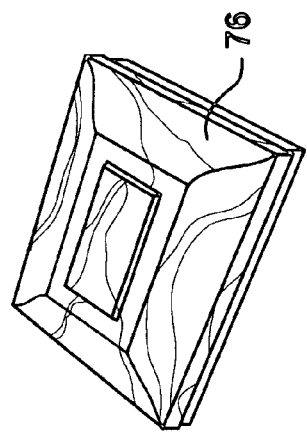

FIG. 14 is a perspective view of a typical work piece processed into a panel with raised cut.

Figure 15:
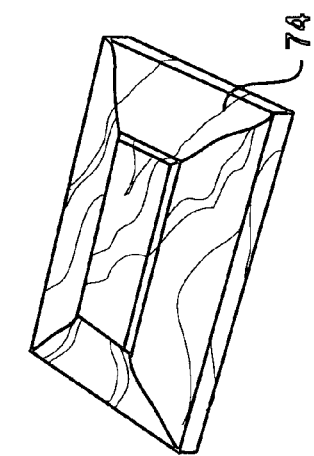

FIG. 15 is a perspective view of a typical work piece processed into a panel with raised door cut.

Figure 16:
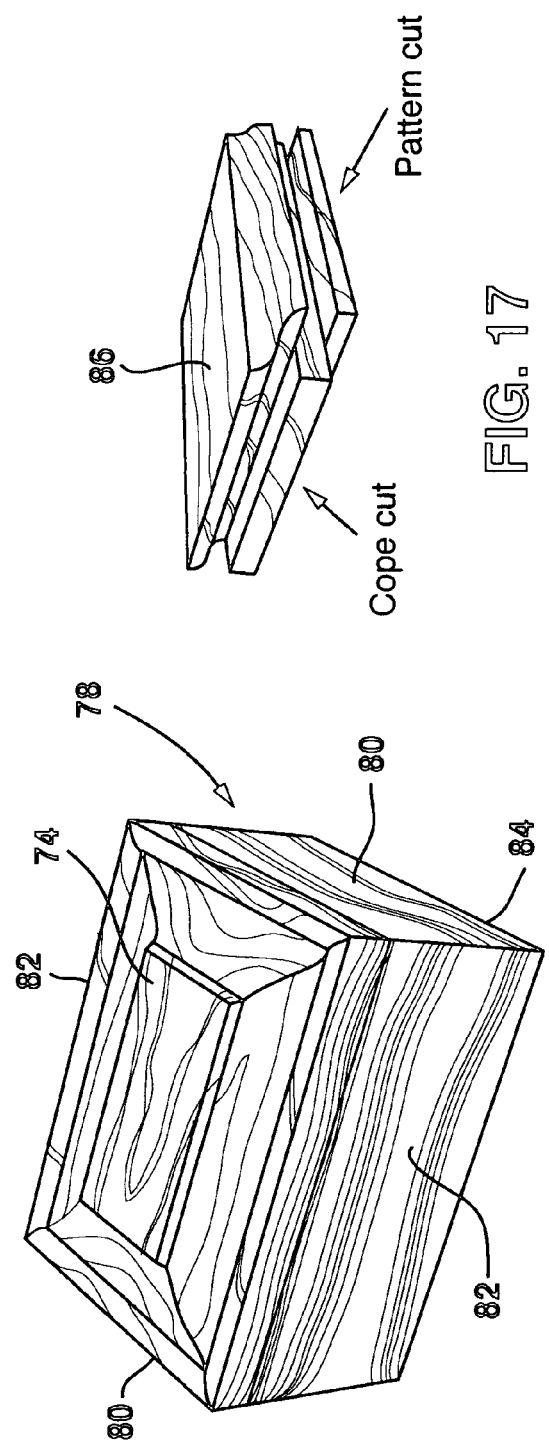

FIG. 16 is a perspective view of a typical fabricated panel box assembly.

Figure 17:
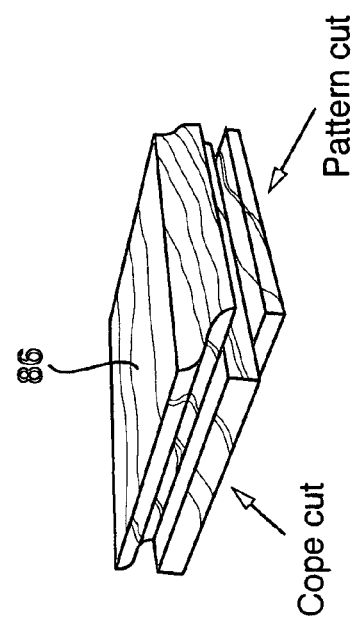

FIG. 17 is a perspective view of a typical work piece processed with cope and pattern cut.

Figure 18:
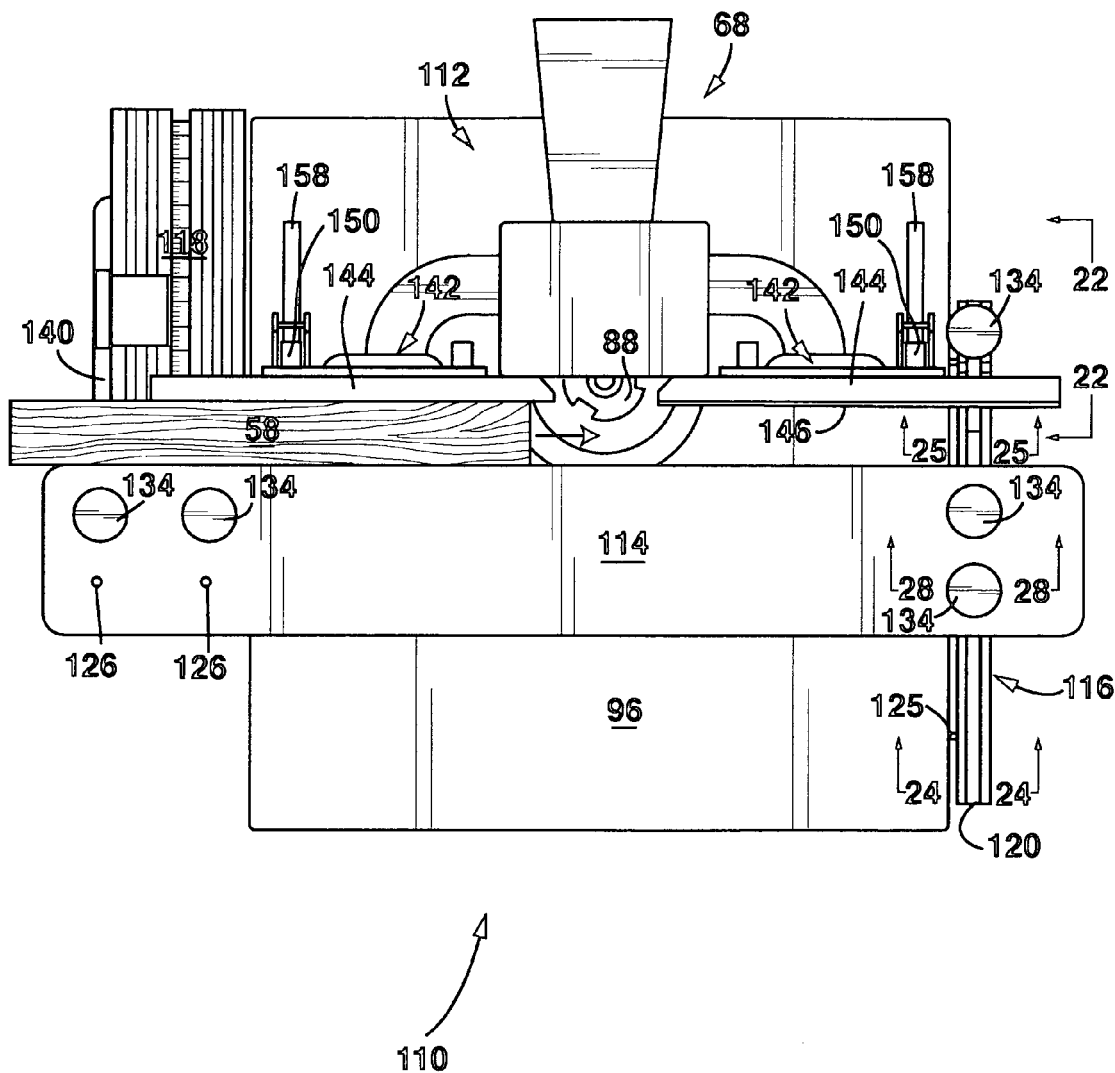

FIG. 18 is a top plan view of the total assembly, specifically showing the adjustable back fence assembly mounted in attachment to a Jointech Clincher Fence Machine, U.S. Pat. No. 5,018,562, on a wood shaper.

Figure 19:
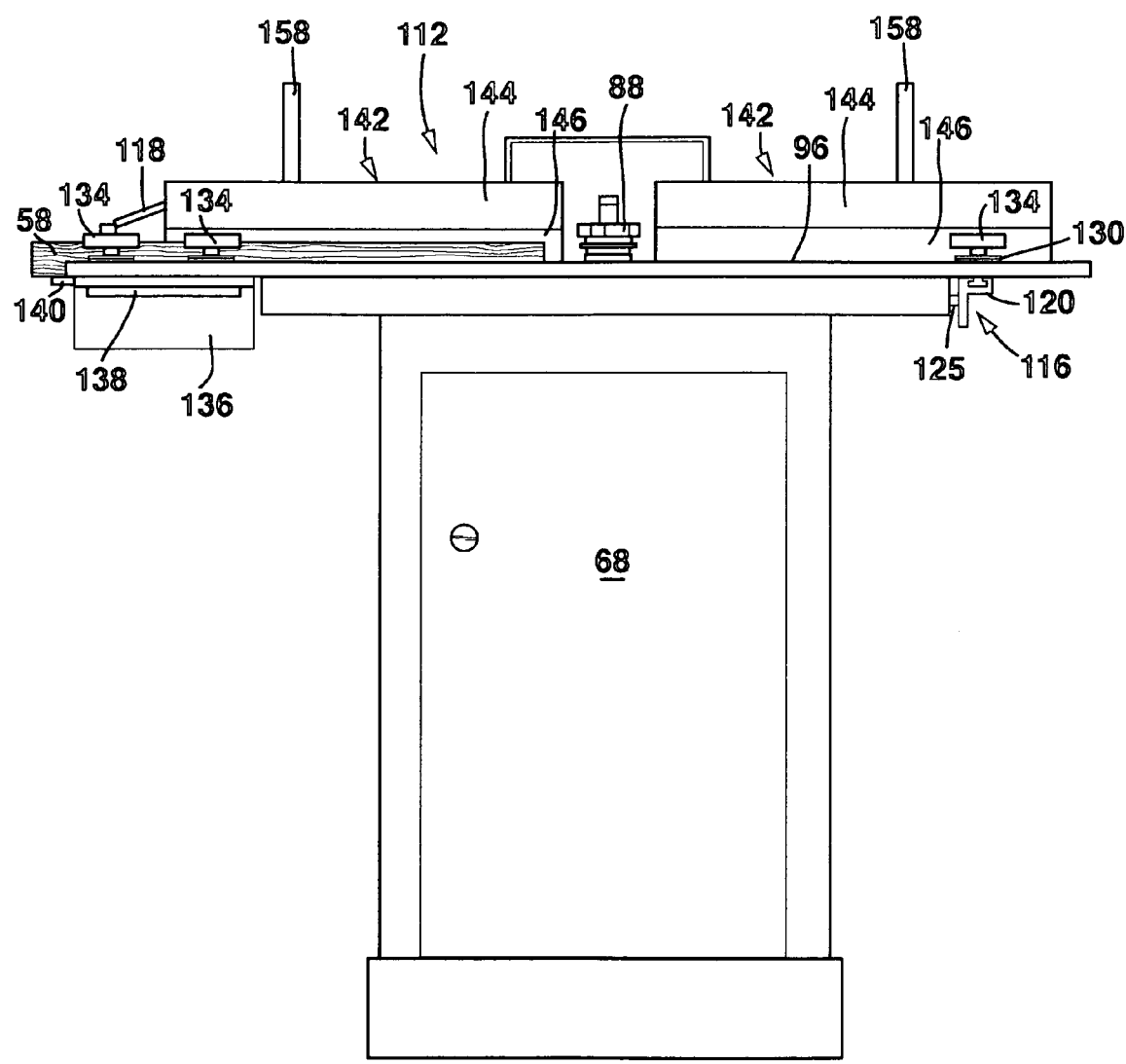

FIG. 19 is a front elevation view of FIG. 18.

Figure 20:
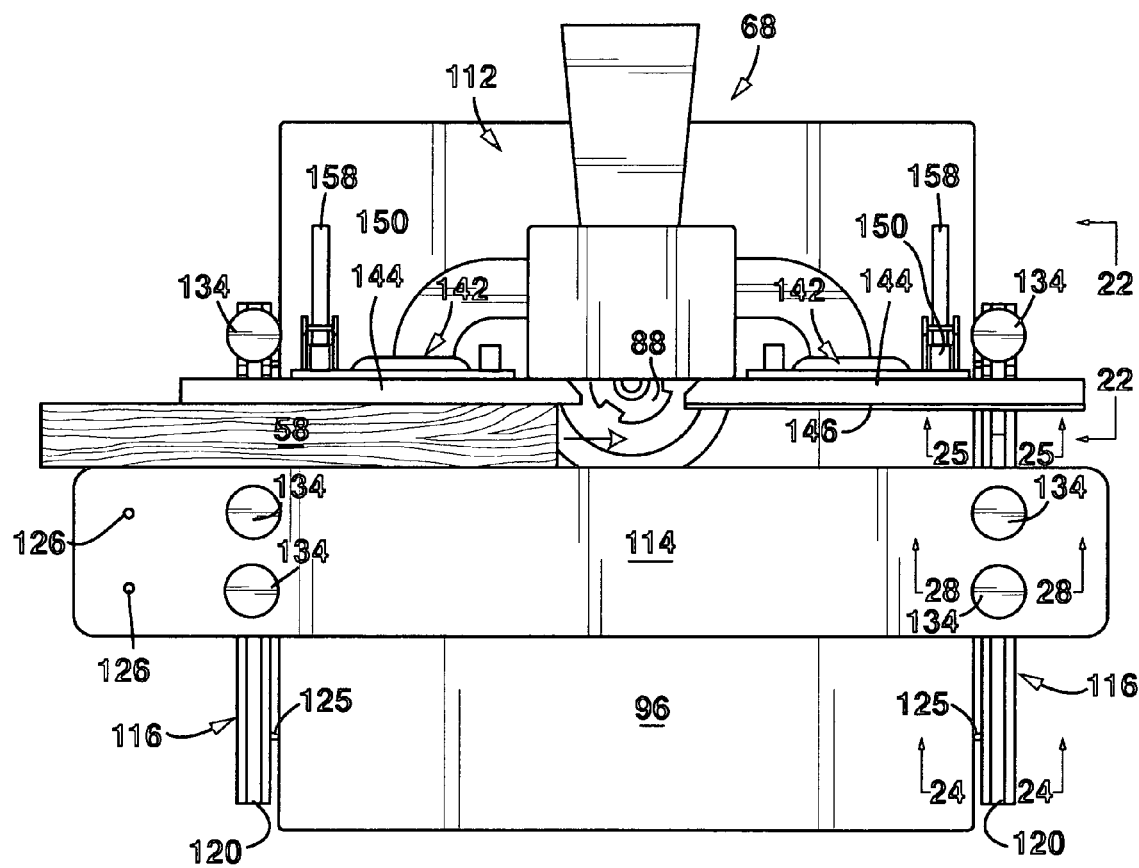

FIG. 20 is a top plan view of the back fence assembly and indexing system mounted on a wood shaper.

Figure 21:
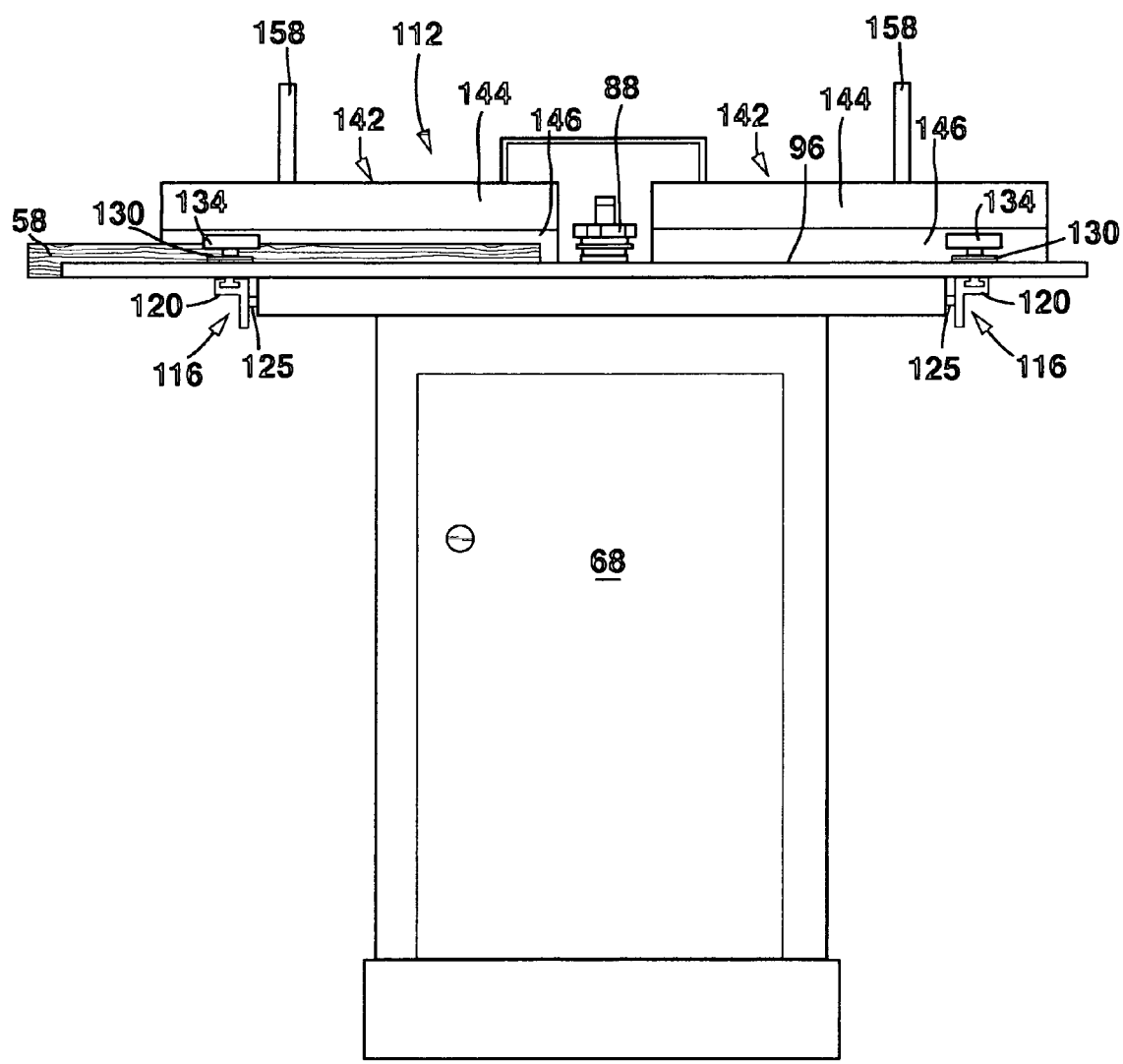

FIG. 21 is a front elevation view of FIG. 20.

Figure 22:
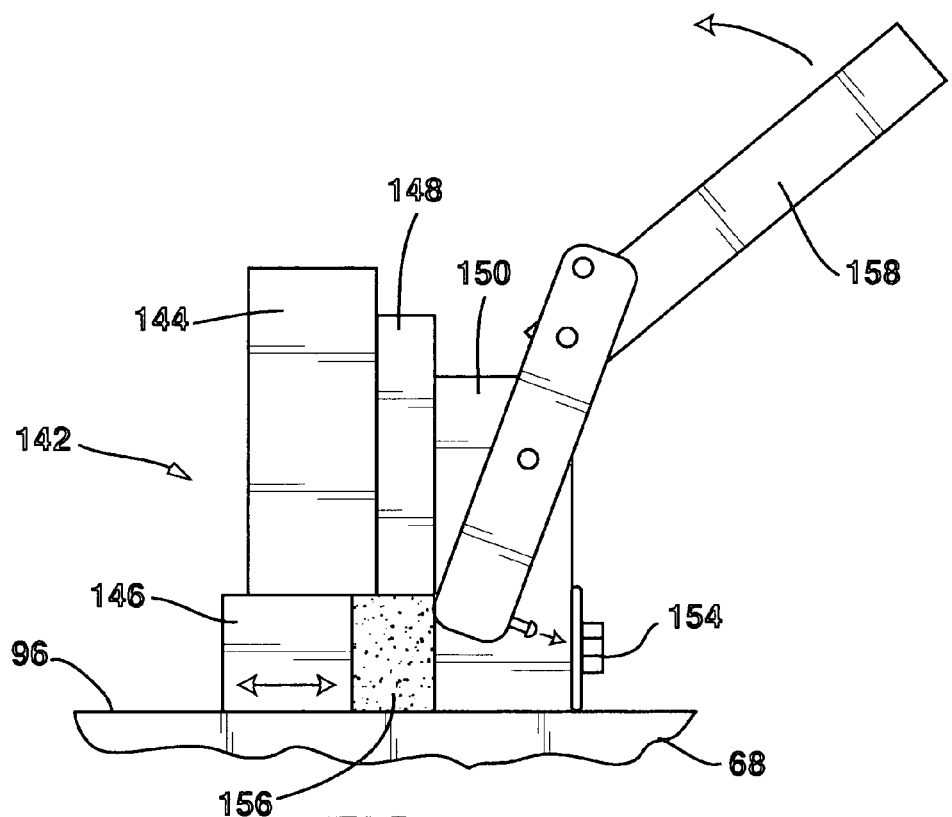

FIG. 22 is side view of the, adjustable front fence, a part of the assembly.

Figure 23:
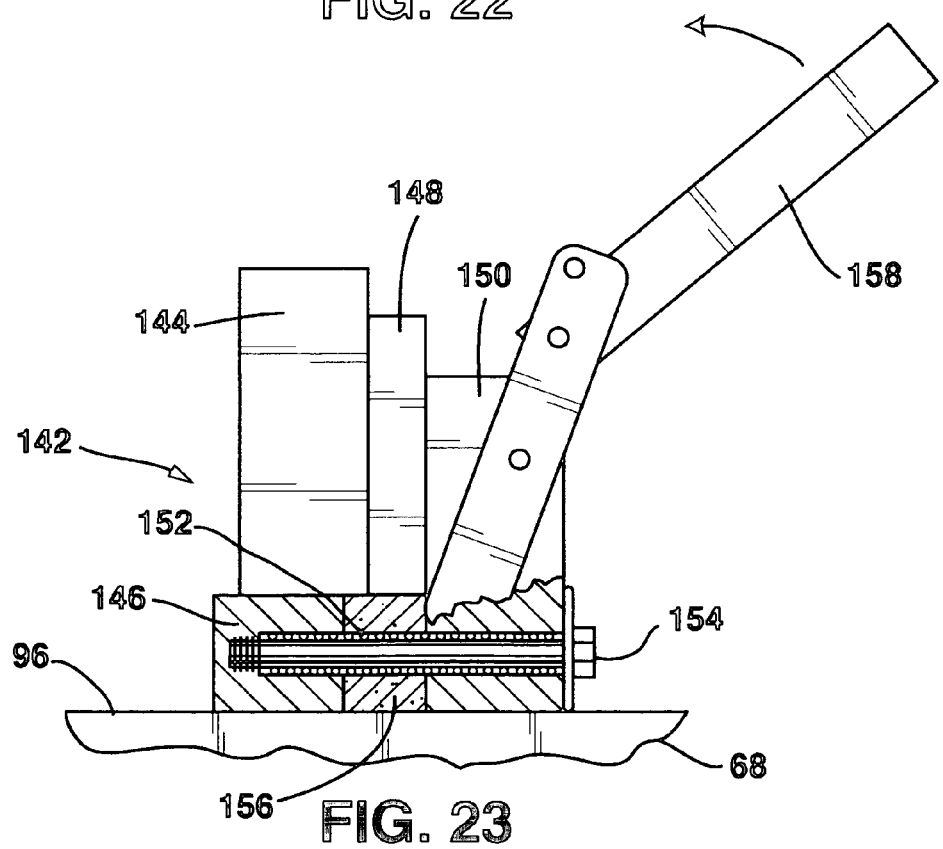

FIG. 23 is a break away view of FIG. 22.

Figure 24:
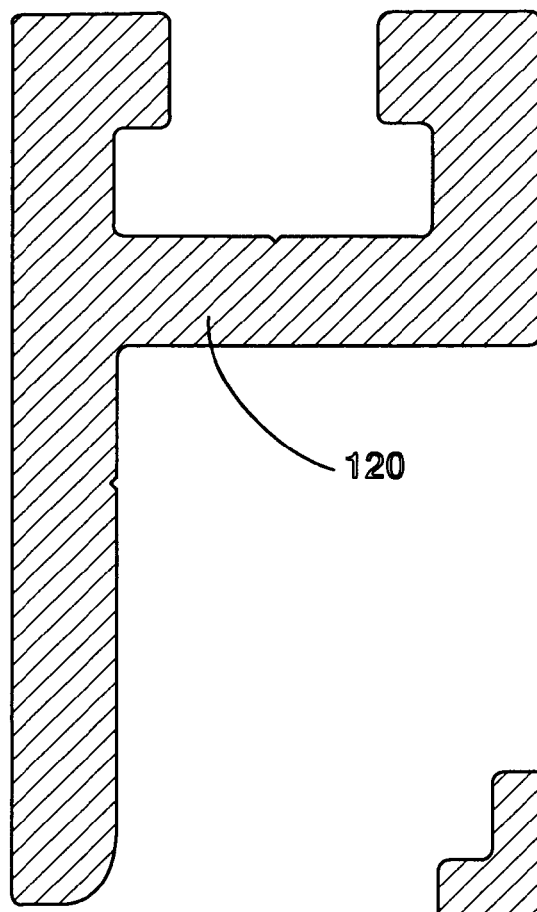

FIG. 24 is a sectional view of the indexing channel extrusion.

Figure 25:
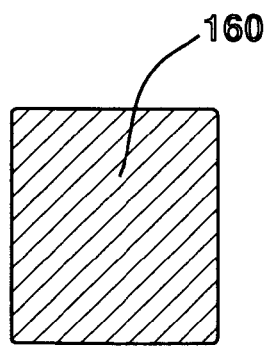

FIG. 25 is a sectional view of an indexing block.

Figure 26:
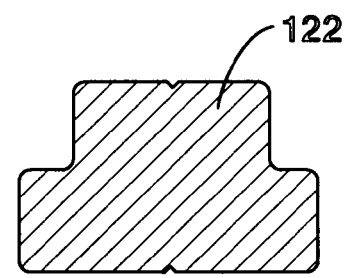

FIG. 26 is a sectional view of a guide attachment component.

Figure 27:
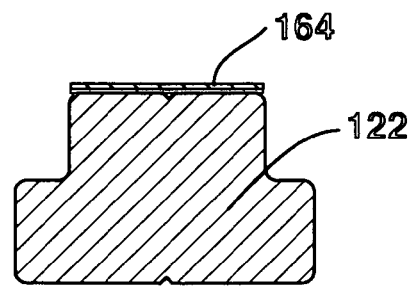

FIG. 27 is a sectional view of a adjustable indexing component.

Figure 28:
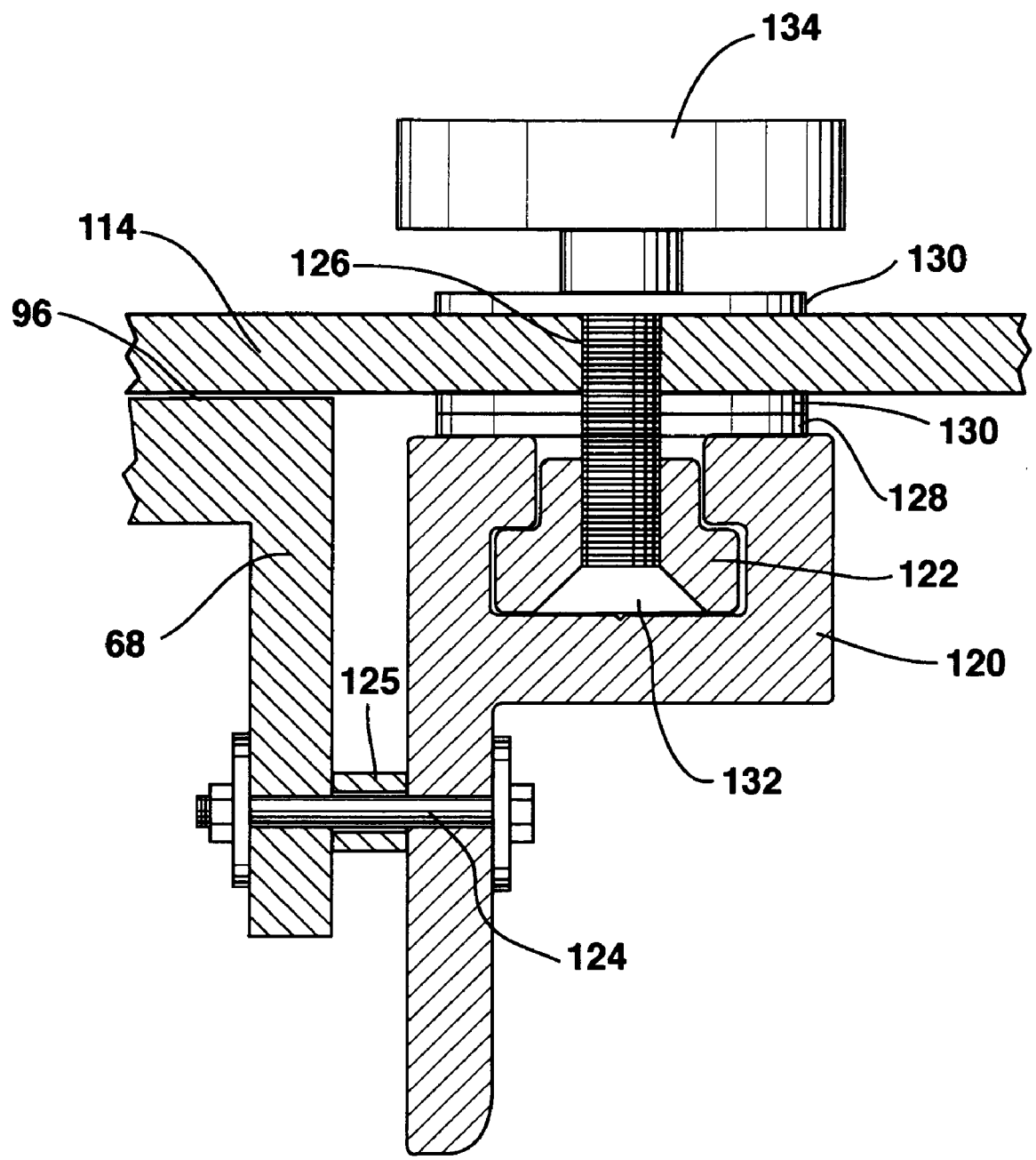

FIG. 28 is a partial sectional view of the adjustable back fence as it typically connects with the indexing components of the assembly.

Figure 29:
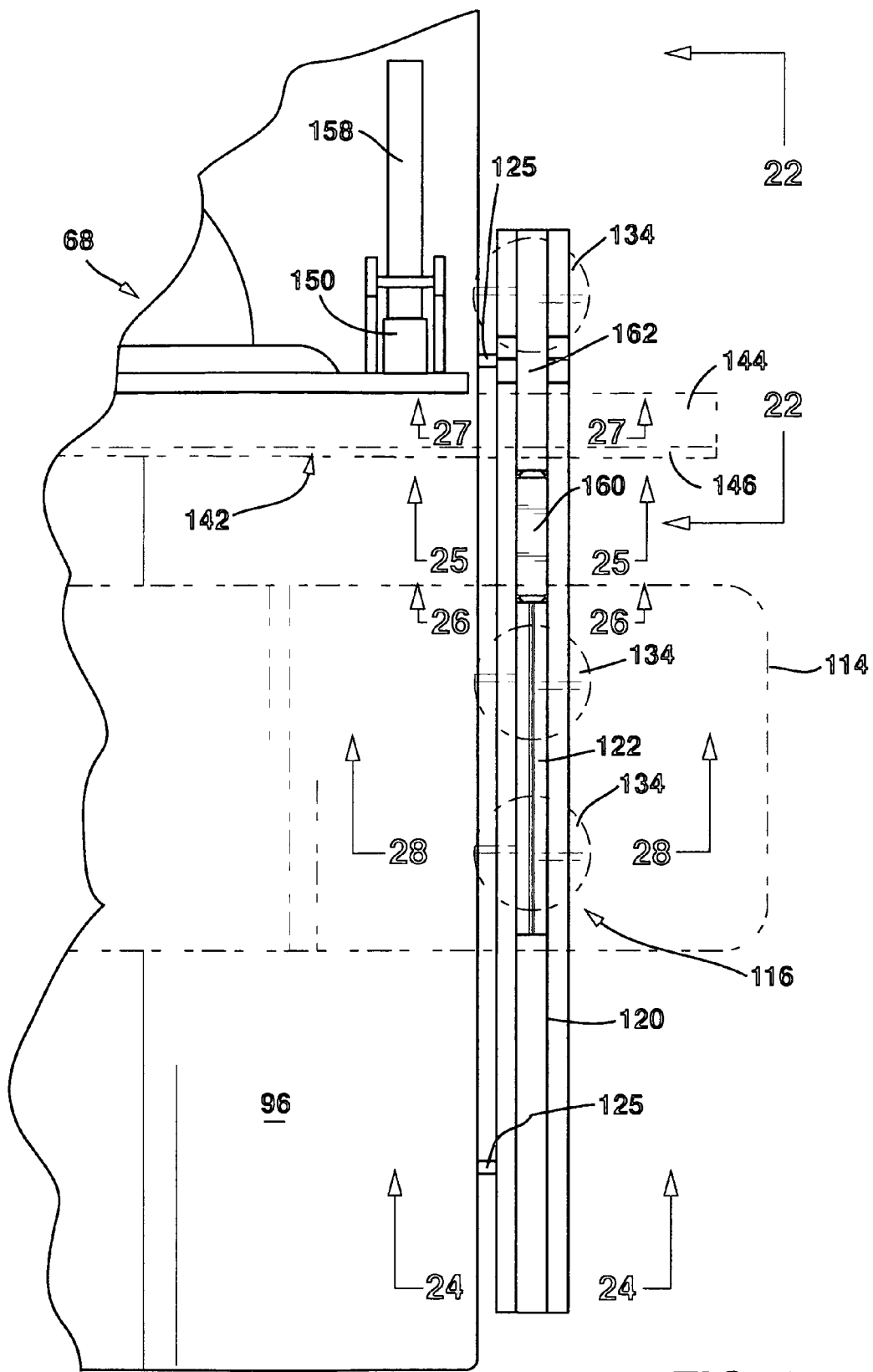

FIG. 29 is a partial view of the assembly with the front and back fence portions shown in phantom lines.

Figure 30:
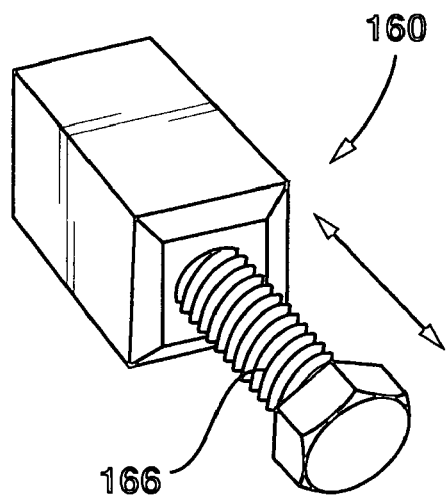

FIG. 30 shows an embodiment of a spacer of adjustable length.

Figure 31:
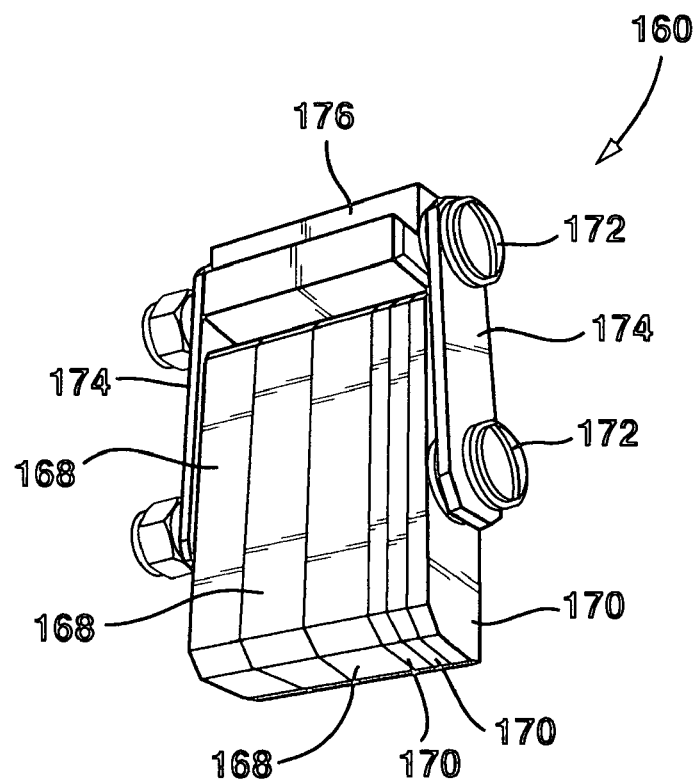

FIG. 31 shows another embodiment of an adjustable spacer.

Figure 32:
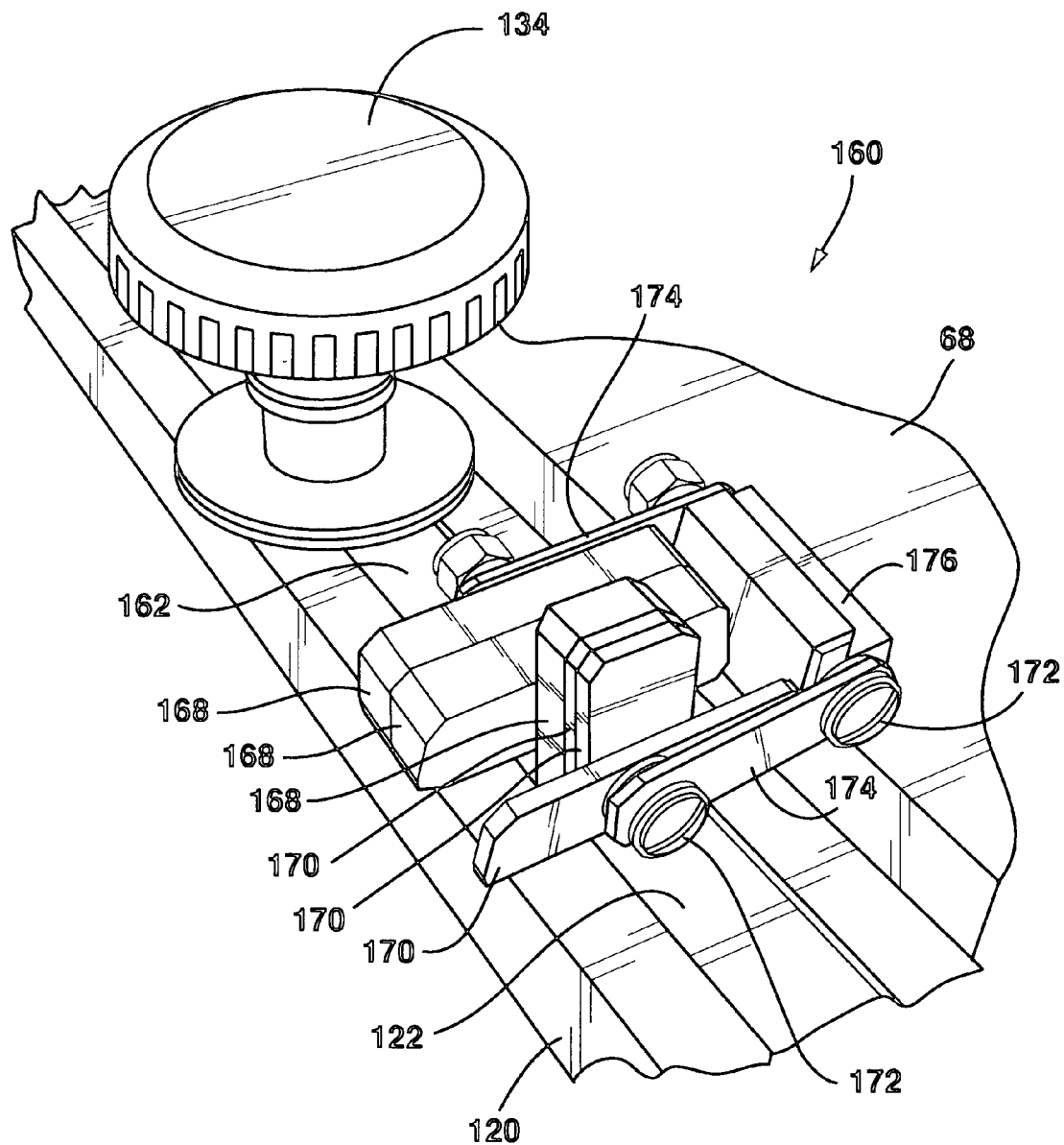

FIG. 32 is a view of the spacer shown in FIG. 31, in use.

DETAILED DESCRIPTION OF THE INVENTION

FIG. 1 is a perspective view of the clamping apparatus assembly 10. It is comprised of a platform base 12 made from 0.75 inch thick Mic 6 aluminum plate. The platform base 12 has a top 14, a bottom 16, a front 18, a back 20, a left side 22 and a right side 24. The top 12 has mounted to it a material stop 52 held in place by general assembly round head machine screws 40. Adjacent to the material stop 52 on the top surface 14 is applied a non slip surface film 48 such as 3M Brand Safetywalk 3-10 Medium Resilient Tread Film. The bottom 16 of platform base 12 has applied to it a slip surface film 50 such as Woodcraft Brand UHMW Slick Strip.

A overhead guide/guard 26 is made from clear poly carbonate sheet such as GE Brand Lexan. Oversized fastening holes are drilled to accommodate general assembly round head bolts 40 which fixes the overhead guard guide 26 to guide/guard risers 28. This is done to accommodate final squaring and alignment with a processing machine fence guide 98. Guide/guard risers are affixed to the top of platform base 12 by general assembly flat head machine screws 42 inserted through the bottom 16 of platform base 12.

A secondary riser support 57 is mounted to the platform base 12 with general assembly flat head machine screws 42 to support secondary handle 56.

Four clamp risers 46 are mounted to platform base 12 by general assembly flat head screws 42. This is done to raise sacrifice stick clamp 44, such as De Sta Co Brand #309U, to appropriate height. Sacrifice stick 60 is held in its place by sacrifice stick clamp 44. The purpose of sacrifice stick 60 is to block in the work piece 58. This serves two purposes. One is to hold in place one side of the work piece 58. The second is to absorb pressure from any cutter it may encounter, such as wood shaper cutter 88, router cutter 90 and table saw blade 92. The work piece 58 is thus saved from break out and chipping by sacrifice stick 60.

The work piece is held in place by large clamp 30 such as De Sta Co Brand #245U. The large clamp 30 is modified by the addition of a custom primary handle 54. The large clamp 30 is mounted on large clamp riser block 32 by four screws 40. Clamp riser block 32 is made from 0.75 inch thick 6061 aluminum plate and has four drilled and tapped holes in its upper surface to accommodate four screws 40. A critical feature of large clamp block 32 is an approximately centrally located drilled and tapped hole in it's bottom surface. This drilled and tapped hole accommodates clamp riser block flat head machine screw 38 which is a 0.5 inch×13×1.5 inch in size. This is a critical part of the assembly as the center line of screw 38 becomes the central pivot access of the entire component assembly, comprised of clamp 30, block 32, four screws 40 and the screw 38. This entire assembly may be placed in any of the plurality of holes 100 drilled through platform base 12. The adjustment holes 100 for block 36 are reamed to accommodate a plane surface 38a, which is the underside of the head of clamp riser block screw 38. Another key feature of the invention is, once clamp 30 is pivoted into it's selected position, screw 38 is tightened to bear on surface 38a. An amount of surface area 38a is needed to supply the critical binding force to secure and hold the placement of the components mentioned above.

Another key feature of the invention is work piece block 62 which is comprised of ten plane surfaces, as shown in the drawings in the preferred embodiment, cut from UHMW Polypropylene (ultra high molecular weight) sheet material. A work block non slip top film 64 and a work block non slip bottom film 66 is applied respectively to work piece block 62. Block 62 may have six or more surfaces, in various manufactures and accommodating various shaped work pieces 58. Blocking of the work piece 58 can be accomplished by contact of block 62 on one, or two sides in the preferred embodiment, of the work piece 58. In particular the block 62 or the work piece 58, as chosen by the operator, is held in it's place by medium clamp 34 such as DeSta Co Brand #237U, which is mounted at the opposite end of the clamping apparatus 10 respective to clamp 30.

The medium clamp 34 is mounted on medium clamp riser block 36 by four screws 40. Block 36 is made from 0.75 inch thick 6061 aluminum plate and has four drilled and tapped holes in its upper surface to accommodate four screws 40. A critical feature of block 36 is an approximately centrally located drilled and tapped hole in it's bottom surface. This drilled and tapped hole accommodates screw 38 which is a 0.5 inch×13×1.5 inch in size. This is a critical part of the assembly as the center line of screw 38 becomes the central pivot access of the entire component assembly, comprised of clamp 34, block 36, screws 40 and the screw 38. This entire assembly may be placed in any of the plurality of holes 100 drilled through platform base 12. The adjustment holes 100 are reamed to accommodate a plane surface 38a, which is the underside of screw 38. This is another key feature of the invention, as once clamp 34 is pivoted into it's selected position, screw 38 is tightened to bear on surface 38a. This amount of surface area 38a is needed to supply the critical binding force to secure and hold the placement of the components mentioned above.

FIG. 2 is a plan view of the clamping apparatus of FIG. 1 and further shows the assembly configuration as described above.

FIG. 3 is perspective view of a first embodiment assembly of the clamping apparatus of FIG. 1. This embodiment is smaller in it's dimension and can also be made of lighter materials than are specified. The object of this first embodiment is to accommodate small processing machines such as are more commonly used by the amateur wood worker in a home environment FIG. 3 is a perspective view of the clamping apparatus assembly 10'. It is comprised of a platform base 12' made from 0.75 inch thick Mic 6 aluminum plate. The platform base 12' has a top 14' a bottom 16', a front 18', a back 20', a left side 22' and a right side 24'. The top 12' has mounted to it a material stop 52' held in place by general assembly round head machine screws 40'. Adjacent to the material stop 52' on the top surface 14' is applied a non slip surface film 48' such as 3M Brand Safetywalk 3-10 Medium Resilient Tread Film. The bottom 16' of platform base 12' has applied to it a slip surface film 50' such as Woodcraft Brand UHMW Slick Strip.

A overhead guide/guard 26' is made from clear poly carbonate sheet such as GE Brand Lexan. Oversized fastening holes are drilled to accommodate general assembly round head bolts 40' which fixes the overhead guard guide 26' to guide/guard risers 28'. This is done to accommodate-final-squaring and alignment with a processing machine fence guide 98'. Guide/guard risers are affixed to the top of platform base 12' by general assembly flat head machine screws 42' inserted through-the-bottom 16' of platform base 12'.

In this first embodiment primary handle riser supports 55' extend to a distance above large clamp 30' and affixed to them is a primary handle 54'.

A secondary riser support 57' is mounted to the platform base 12' with screws 42' to support secondary handle 56'.

Four clamp risers 46' are mounted to platform base 12' by screws 42'. This is done to raise sacrifice stick clamp 44', such as De Sta Co Brand #309U to appropriate height. Sacrifice stick 60' is held in its place by clamp 44'. The purpose of sacrifice stick 60' is to block in the work piece 58'. This serves two purposes. One is to hold in place, one side of the work piece 58'. The second is to absorb pressure from any cutter it may encounter, such as wood shaper cutter 88', router cutter 90' and table saw blade 92'. The work piece 58' is thus saved from break out and chipping by sacrifice stick 60'.

The work piece is held in place by large clamp 30' such as De Sta Co Brand #245U. The large clamp 30' is mounted on large clamp riser block 32' by four screws 40'. Clamp riser block 32' is made from 0.75 inch thick 6061 aluminum plate and has four drilled and tapped holes in its upper surface to accommodate four screws 40'. A critical feature of block 32' is an approximately centrally located drilled and tapped hole in it's bottom surface. This drilled and tapped hole accommodates clamp riser block flat head machine screw 38'which is a 0.5 inch×13×1.5 inch in size. This is a critical part of the assembly as the center line of screw 38' becomes the central pivot access of the entire component assembly, comprised of clamp 30', block 32', four screws 40' and the screw 38'. This entire assembly may be placed in any of the plurality of holes 100' drilled through platform base 12'. The holes 100' are reamed to accommodate a plane surface 38a', which is the underside of screw 38'. This is another key feature of the invention, as once clamp 30' is pivoted into it's selected position, screw 38' is tightened to bear on surface 38a'. This amount of surface area 38a' is needed to supply the critical binding force to secure and hold the placement of the components mentioned above.

Another key feature of the invention is work piece block 62' which is comprised of ten plane surfaces, as shown in the drawings in the preferred embodiment, cut from UHMW Polypropylene (ultra high molecular weight) sheet material.

A work block non slip top film 64' and a work block non slip bottom film 66' is applied respectively to work piece block 62'. Block 62' may have six or more surfaces, in various manufactures and accommodating various shaped work pieces 58'. Blocking of the work piece 58 can be accomplished by contact of work piece block 62' on one, or two sides in the preferred embodiment, of the work piece 58'. In particular the block 62 or the work piece 58' is held in it's place by medium clamp 34' such as DeSta Co Brand #237U; which is mounted at the opposite end of the clamping apparatus 10' respective to clamp 30'.

The clamp 34' is mounted on medium clamp riser block 36' by four screws 40'. Block 36' is made from 0.75 inch thick 6061 aluminum plate and has four drilled and tapped holes in its upper surface to accommodate four screws 40'. A critical feature of block 36' is an approximately centrally located drilled and tapped hole in it's bottom surface. This drilled and tapped hole accommodates clamp riser block flat head machine screw 38' which is a 0.5 inch×13×1.5 inch in size. This is a critical part of the assembly as the center line of screw 38' becomes, the central pivot access of the entire component assembly, comprised of clamp 34', block 36', four screws 40' and screw 38'. This entire assembly may be placed in any of the plurality of holes 100' drilled through platform base 12'. The holes 100' are reamed to accommodate a plane surface 38a', which is the underside of screw 38'. This is another key feature of the invention, as once clamp 34' is pivoted into it's selected position, screw 38' is tightened to bear on surface 38a'. This amount of surface area 38a' is needed to supply the critical binding, force to secure and hold the placement of the components mentioned above.

FIG. 4 is a plan view of the clamping apparatus 10' of FIG. 3 and further shows the assembly as described above.

FIG. 5 is a bottom view of the clamping apparatus assembly 10 of FIG. 1 and further shows the assembly as described above.

FIG. 6 is a bottom view of the clamping apparatus assembly 10' of FIG. 3 and further shows the assembly as described above.

FIG. 7 is a top perspective view of a typical flat head machine bolt 42 and 42' used in the general assembly of the clamping apparatus.

FIG. 8 is a bottom perspective view of a typical flat head machine bolt 38 and 38' used in the general assembly of the clamping apparatus.

FIG. 9 is a top perspective view of a typical round head machine bolt 40 and 40' used in the general assembly of the clamping apparatus.

FIG. 10 is a perspective view of a wood shaper 68 with the clamping apparatus assembly 10 of FIG. 1 shown in use. An operator by the use of a primary handle 54 and a secondary handle 56, moves the clamping apparatus 10 through it's contact with wood shaper cutter 88 by a constant forward moving pressure with a primary point of contact being the engagement of a overhead guard/guide 26 with a processing machine fence guide 98. The clamping apparatus 10 is glided across a processing machine table surface 96 without any engagement into miter slot 94.

FIG. 11 is a perspective view of a table saw 70 with the clamping apparatus assembly of FIG. 1 shown in use. An operator, by the use of a handle 54 and a handle 56, moves the clamping apparatus 10 through it's contact with table saw blade 92 by a constant forward moving pressure with a primary point of contact being the engagement of a overhead guard/guide 26 with a processing machine fence guide 98. The clamping apparatus 10 is glided across a processing machine table surface 96 without any engagement into miter slot 94.

FIG. 12 is a perspective view of a router table 72 with the clamping apparatus assembly of FIG. 1 shown in use. An operator, by the use of a handle 54 and a handle 56, moves the clamping apparatus 10 through it's contact with a router cutter 90 by a constant forward moving pressure with a primary point of contact being the engagement of a overhead guard/guide 26 with a fence guide 98. The clamping apparatus 10 is glided across a processing machine table surface 96.

FIG. 13 is a perspective view of a typical work piece 58 and 58' and a typical sacrifice stick 60 and 60' as shown in FIG. 1 through FIG. 4. FIG. 13 through FIG. 17 are typical examples of work pieces produced by this invention and process of manufacture.

FIG. 14 is a perspective view of a typical work piece processed into a panel with raised cut 74.

FIG. 15 is a perspective view of a typical work piece processed into a panel with raised door cut 76.

FIG. 16 is a perspective view of a typical fabricated panel box assembly 78 comprised of two short miter cut side panels 80, two long miter cut side panels 82, a bottom flat cut panel 84 and a top panel with raised cut 74.

FIG. 17 is a perspective view of a typical work piece processed with cope and pattern cut 86.

FIG. 18 is a top plan view of the system 110, specifically showing the adjustable back fence assembly 112 mounted in attachment to a fence system such as that sold by Jointech, Inc. of San Antonio, Texas under the tradename. Clincher Fence Machine 118, as disclosed in U.S. Pat. No. 5,018,562, the teachings of which are incorporated herein in their entirety by reference, on a wood shaper 68. The system 110 is attachable to other manufactures equipment. The adjustable back fence assembly 114 consists of a horizontal plate 114 made of Mic-6 aluminum in the preferred embodiment which is resurfaceable along the work edge due to excessive wear. Other materials such as steel, composite materials or plastic can be used as well. The horizontal plate 114 is connected on one side to an indexing channel system 116. In the preferred embodiment the horizontal plate 114 is connected on the opposite side to the Jointech Clincher 118. This device could be substituted by other manufacturers devices of the same scope, function and nature.

The system 116 is comprised of a mating extrusion 120. A T extrusion 122 inserts and moves within the female hollow of extrusion 120. T extrusion 12 is drilled and fitted with two socket cap screws 124. Horizontal plate 114 has a multiple of holes 126. In the preferred embodiment, assembly of the adjustable back fence assembly 112, the indexing channel system 116 is connected to the wood shaper 68. This connection is made by drilling a pair of holes in the perpendicular edge of processing machine table surface 96. Socket cap screws 124 insert through extrusion 120, spacers 125, wood shaper 68 and fix these elements in their preferred relationship. Key importance to the continued assembly is, T extrusion 122 sets down slightly in the female hollow of the extrusion 120. Nylon washers 128 and metal washers 130 are then placed over flat head socket cap screws 132. The horizontal plate 114 and it's holes 126 are placed over screws 132. Assembly is completed by placing a washer 130 and knobs 134 in connection with screws 132. As knobs 134 are tightened they immobilize T extrusion 122 in the extrusion 120. This is the desired position of adjustment while normal cutting and shaping or climb cutting or shaping occur.

In the preferred embodiment, the Jointech Clincher 118 is attached to an 6061 aluminum plate 140, in attachment to the wood shaper 68, and a 6061 aluminum angle 136 and it's adjacent steel bar 138. This is performed for stability and long term durability. Horizontal plate 114 is then connected through holes 126 in attachment to the Jointech Clincher 118. The Jointech Clincher 118 and knobs 134 are means of adjustment for the adjustable back fence assembly 112.

FIG. 19 is a front elevation view of FIG. 18.

FIG. 20 is a top plan view of the back fence assembly and indexing system mounted on a wood shaper. This configuration is like the configuration shown in FIG. 18. The exception is the Jointech Clincher 118 is not used. In it's place the indexing channel system 116 is used. Installation and function of system 116 is as described previously in FIG. 18.

FIG. 21 is a front elevation view of FIG. 20.

FIG. 22 is side view of the, adjustable front fence, a part of the assembly. Wood shapers typically are manufactured with a non adjustable wood fence components. In the preferred embodiment these are replaced by a pair of pressure bar devices 142. These components provide a force and assist in keeping work piece 58 against the horizontal plate 114 while the work piece 58 is in the motion of being processed.

FIG. 23 is a break away view of FIG. 22. Pressure bar device 142 is comprised of a UHMW bar 144, a pressure UHMW bar 146, a support bar 148, back blocks 150, a spring 152, a hex head bolt 154, foam rubber 156 and a retracting handle 158 assembled in the preferred configuration as shown in the drawings. The spring 152 is protected from processing waste by foam rubber 156 which prevents jamming of the system.

FIG. 24 is a sectional view of the indexing channel extrusion.

FIG. 25 is a sectional view of an indexing block.

FIG. 26 is a sectional view of a guide attachment component.

FIG. 27 is a sectional view of a adjustable indexing component. T extrusion 122 has a vinyl strip 164 attached by adhesive to it's top surface. The purpose of the vinyl strip 164 is to provide an erasable marking surface. Indexing marks are placed on this vinyl strip 164 by the operator for his convenience and memory in setting up the system assembly 110. It is common that cutters or cutter sets are changed during a manufacturing run. Correspondence must be maintained. Work piece 58 is precessioned and processed by this method.

FIG. 28 is a partial sectional view of the adjustable back fence 114 as it typically connects with the indexing system 116 of the assembly and it's components. This view further shows what has already been described in the preferred embodiment.

FIG. 29 is a partial view of the assembly with the front and back fence portions shown in phantom lines. This view further shows what has already been described in the preferred embodiment. This view more fully shows the use and configuration of spacer 160 and back stop 162.

Spacers 160 are an integral part of the system assembly 110. Spacers 160 limit the movement of horizontal plate 114 toward the wood shaper cutter 88 until the spacer 160 is stopped by the back stop 162. Back stop 162 is adjustable and moves in either direction in extrusion 120. Back stop 162 is fixable by adjustment and tightening of it's knob 134. To more fully describe spacers 160. Spacers 160 can be used singularly or in pairs and can be any length from 0 to infinity. Typically spacers 160 are provided in lengths from 1.5 to 2.5 inches in increments of 0.0625 of an inch. Spacers 160 can be combined with other spacers 160 of integer dimensions. Spacers 160 can be of adjustable length.

Spacers 160 functionally provide memory. Spacers 160 provide a means for the operator to quickly change adjustment of system assembly 110.

FIG. 30 Shows an embodiment of spacer 160 which is of adjustable length by rotation of the hex bolt 166.

FIG. 31 Shows a further embodiment of spacer 160 which is comprised of three precision finger gauges 168 measuring 0.25 inches and three precision finger gauges 170 measuring 0.0625 in thickness. Gauges 168 and 170 pivot on center about a connecting bolt 172. Plates 174 functionally align with holding block 176 which also pivots about a connecting bolt 172.

Set ups from 0.0625 inch to 0.9375 inch can immediately be obtained from use of various combinations of the gauges 168 and 170.

By setting up one side of the indexing channel system 116 with a spacer setting 0.0625 inch less than the other side, the middle of the horizontal plate 114 will be moved 0.03125 inch and will functionally dimension to this small tolerance.

FIG. 32 Shows, in use, embodiment of spacer 160 as described in FIG. 31.

In conclusion thus, the reader will see the Positioning System For Work Piece Milling and a process for installation of it's major components, comprised of a clamping devise and adjustable back fence, for precision processing of material on a wood shaper, a router table and a table saw provides a highly reliable, light weight, yet heavy duty, economical device that can be used in a manual version by professionals and amateurs alike and can also be automated by any means possible to further enhance it's efficiency. In fact great value is obtained from being able to stack and interchange a clamping apparatus 10, 10' and a adjustable back fence assembly 112 to convert from cope cuts to pattern cuts. Great advantage is obtained in being able to switch easily between doing the cope and pattern cuts. This is done by mounting an entire set of cutters, typically six stacked onto the shaper spindle, all at the same time. Individual cutters are typically 1.250 inches in thickness. The cope clamping device has a base that is typically 1.290 inches in thickness. The work piece is mounted on this base. This allows for precision positioning of the work piece to perform the cope cut on the top cutters. The pattern cut is obtained by use of the back fence and the shaper table surface to engage the bottom cutters. With this system, once the cutters are installed, there is no need to move or adjust the cutters. Precision join able cope and pattern cuts are obtained by use of this system.

While the above description contains many specificties, these should not be construed as limitations on the scope of the invention, but rather as an exemplification of one preferred embodiment and a first embodiment thereof. Many other variations are possible such as additional numbers of clamps, plates, extrusions, automation, other proportional and dimensional configurations, various use of materials in construction, pluralities of work piece blocks, handles and knobs and installation on all types of processing equipment.

Accordingly, the scope of the invention should be determined not by the embodiments illustrated, but by the appended claims and their legal equivalents.

REFERENCE NUMERALS 10, 10' A Clamping Apparatus
12, 12' Platform Base 14, 14' Platform Base Top
16, 16' Platform Base Bottom
18, 18' Platform Base Front
20, 20' Platform Base Back
22, 22' Platform Base Left Side
24, 24' Platform Base Right Side
26, 26' Overhead Guide/Guard
28, 28' Guide/Guard Risers
30, 30' Large Clamp
32, 32' Large Clamp Riser Block
34, 34' Medium Clamp
36, 36' Medium Clamp Riser Block
38, 38' Clamp Riser Block Flat Head Machine Screw
40, 40' General Assembly Round Head Machine Screw
42, 42' General Assembly Flat Head Machine Screw
44, 44' Sacrifice Stick Clamp
46, 46' Clamp Risers
48, 48' Non Slip Surface Film
50, 50' Slip Surface Film
52, 52' Material Stop
54, 54' Primary Handle
55' Primary Handle Riser Support
56, 56' Secondary Handle
57, 57' Secondary Handle Riser Support
58, 58' Work Piece
60, 60' Sacrifice Stick
62, 62' Work Piece Block
64, 64' Work Block Non Slip Top Film
66, 66' Work Block Non Slip Bottom Film
68 Wood Shaper
70 Table Saw
72 Router Table
74 Panel With Raised Cut
76 Panel With Raised Door Cut
78 Fabricated Panel Box
80 Short Miter Cut Side Panel
82 Long Miter Cut Side Panel
84 Bottom Flat Cut Side Panel
86 Work Piece With Cope and Pattern Cut
88 Wood Shaper Cutter
90 Router Shaper Cutter
92 Table Saw Blade
94 Miter Slot
96 Processing Machine Table Surface
98 Processing Machine Fence Guide
100 Holes
110 Total System Assembly
112 Adjustable Back Fence Assembly
114 Horizontal Plate
116 Indexing Channel System
118 Jointech Clincher
120 Mating Extrusions
122 T Extrusion
124 Socket Cap Screws
125 Spacers
126 Holes in Horizontal Plate
128 Nylon Washers
130 Metal Washers
132 Flat Head Socket Cap Screws
134 Knobs
136 Angle
138 Bar
140 Plate
142 Pressure Bar Device
144 UHMW Bar
146 Pressure UHMW Bar
148 Support Bar
150 Back Blocks
152 Spring
154 Hex Head Bolt
156 Foam Rubber
158 Retracting Handle
160 Spacers
162 Back Stops
164 Vinyl Strip
166 Adjustable Hex Bolt
168 ¼ Inch Finger Gauges
170 ¹⁄₁₆ Inch Finger Gauges
172 Connection Bolt
174 Plates
176 Holding Block

I claim:

1. A device for work piece milling on a woodworking tool having a cutting portion, the woodworking tool chosen from the group consisting of a wood shaper, a router table and a table saw, the woodworking tool allowing work piece movement on the woodworking tool through the cutting portion in a first direction, the device comprising:

a. an indexing system comprising:
1) an indexing channel system including at least one channel having an elongated slot, the channel having a channel stop securable at one end of the elongated slot, the channel being attachable to the woodworking tool so that the channel is secured to the woodworking tool so that the elongated slot is approximately perpendicular to the direction of work piece movement through the cutting portion on the woodworking tool;
2) at least one indexing spacer of predeterminable length that fits within and is retained in the elongated slot of the channel; and b. a horizontal plate attachable to the indexing system through at least one adjustable connection, the connection having a connection member extending into the elongated slot of the channel, the connection member interacting with the elongated slot to secure the horizontal plate to the channel in a spaced relationship from the channel stop, the spaced relationship determined by the length of the indexing spacer;

whereby, once the indexing channel system is secured to the woodworking tool and the channel stop securely located at the one end of the elongated slot, the horizontal plate is moved toward the cutting portion until the connection member contacts the indexing spacer so that the horizontal plate is positioned a distance from the cutting portion of the woodworking tool in a precisely determined distance from the cutting portion of the woodworking tool, the distance determined by the length of the indexing spacer.

2. The device of claim 1 further comprising a bracket interlocking the device to a fence system.

3. The device of claim 1 wherein: the channel of the indexing channel system is an extruded piece; the elongated slot is formed in cross-section in an upright or inverted T shape; and the connection includes anchoring means interacting with the elongated slot for securing the horizontal plate to the indexing channel system.

4. The device of claim 1 wherein the indexing spacer of predeterminable length is chosen from a group consisting of indexing spacers having a preset length or an adjustable length.

5. The device of claim 4 wherein the indexing spacer of predeterminable length comprises a body having a threaded hole and an opposed end and a hex bolt having a head, the hex bolt having threads that are threaded into the threaded hole of the body whereby the distance from the opposed end of the body and the head of the hex bolt, and consequently the length of the spacer, is determined by rotating the hex bolt into or out of the threaded hole of the body.

6. The device of claim 4 wherein the indexing spacer of predeterminable length comprises:
  at least two finger gauges aligned side by side, each finger gauge having a hole extending entirely through the finger gauge transverse to the side by side alignment;
  a connecting bolt extending through the holes in the finger gauges, the connecting bolt holding the gauges in side by side alignment.

7. The device of claim 4 wherein the indexing spacer of predeterminable length comprises:
  at least three relatively thick finger gauges aligned side by side, each relatively thick finger gauge having a hole extending entirely through the finger gauge transverse to the side by side alignment;
  at least three relatively thin finger gauges aligned side by side, each relatively thin finger gauge having a hole extending entirely through the finger gauge transverse to the side by side alignment;
  a first connecting bolt extending through the holes in the finger gauges, the first connecting bolt holding the gauges in side by side alignment.

8. The device of claim 7 wherein each of the at least three relatively thin finger gauges are each one third the thickness of one of the relatively thick finger gauges.

9. The device of claim 7 further comprising:
  a second connecting bolt;
  a pair of plates located on opposed sides of the finger gauges, the pair of plates attached to and pivoting about the first connecting bolt, the pair of plates having holes at one end to allow the second connecting bolt to pass therethrough; and
  a block located between the pair of plates at one end of the finger gauges, the block having a hole extending entirely through the block, the hole in the block holding the second connecting bolt whereby the block pivots about the second connecting bolt.

10. A device for work piece milling on a woodworking tool having a cutting portion, the woodworking tool chosen from the group consisting of a wood shaper, a router table and a table saw, the woodworking tool allowing work piece movement on the woodworking tool through the cutting portion in a first direction, the device comprising:
  a. an indexing system comprising:
    1) an indexing channel system including at least one channel having an elongated slot, the channel having a channel stop securable at one end of the elongated slot, the channel being attachable to the woodworking tool so that the channel is secured to the woodworking tool so that the elongated slot is approximately perpendicular to the direction of work piece movement through the cutting portion on the woodworking tool wherein: and
      the channel of the indexing channel system is an extruded piece;
      the elongated slot is formed in cross-section in an upright or inverted T shape;
    2) at least one indexing spacer of predeterminable length that fits within and is retained in the elongated slot of the channel wherein the indexing spacer of predeterminable length may either have a preset length or an adjustable length; and
  b. a horizontal plate attachable to the indexing system through at least one adjustable connection, the connection having a connection member extending into the elongated slot of the channel, the connection member interacting with the elongated slot to secure the horizontal plate to the channel in a spaced relationship from the channel stop, the spaced relationship determined by the length of the indexing spacer;
  whereby, once the indexing channel system is secured to the woodworking tool and the channel stop securely located at the one end of the elongated slot, the horizontal plate is moved toward the cutting portion until the connection member contacts the indexing spacer so that the horizontal plate is positioned a distance from the cutting portion of the woodworking tool in a precisely determined distance from the cutting portion of the woodworking tool, the distance determined by the length of the indexing spacer.

11. The device of claim 10 further comprising a bracket interlocking the device to a fence system.

12. The device of claim 10 wherein the indexing spacer of predeterminable length comprises a body having a threaded hole and an opposed end and a hex bolt having a head, the hex bolt having threads that are threaded into the threaded hole of the body whereby the distance from the opposed end of the body and the head of the hex bolt, and consequently the length of the indexing spacer, is determined by rotating the hex bolt into or out of the threaded hole of the body.

13. The device of claim 10 wherein the indexing spacer of predeterminable length comprises:
  at least two finger gauges aligned side by side, each finger gauge having a hole extending entirely through the finger gauge transverse to the side by side alignment;
  a connecting bolt extending through the holes in the finger gauges, the connecting bolt holding the gauges in side by side alignment.

14. The device of claim 10 wherein the indexing spacer of predeterminable length comprises:
  at least three relatively thick finger gauges aligned side by side, each relatively thick finger gauge having a hole extending entirely through the finger gauge transverse to the side by side alignment;
  at least three relatively thin finger gauges aligned side by side, each relatively thin finger gauge having a hole extending entirely through the finger gauge transverse to the side by side alignment;
  a first connecting bolt extending through the holes in the finger gauges, the first connecting bolt holding the gauges in side by side alignment.

15. The device of claim 14 wherein each of the at least three relatively thin finger gauges are each one third the thickness of one of the relatively thick finger gauges.

16. The device of claim 14 wherein the indexing spacer further comprises:
  a second connecting bolt;
  a pair of plates located on opposed sides of the finger gauges, the pair of plates attached to and pivoting about the first connecting bolt, the pair of plates having holes at one end to allow the second connecting bolt to pass therethrough; and
  a block located between the pair of plates at one end of the finger gauges, the block having a hole extending entirely through the block, the hole in the block holding the second connecting bolt whereby the block pivots about the second connecting bolt.

* * * * *